United States Patent
Zhang et al.

(10) Patent No.: US 6,567,578 B1
(45) Date of Patent: May 20, 2003

(54) FIBER OPTIC DEVICE OPERATING AT TWO OR MORE WAVELENGTHS

(75) Inventors: B. Barry Zhang, Lawrenceville, NJ (US); Liang-Ju Lu, Eden Prairie, MN (US)

(73) Assignee: ADC Telecommunications, Eden Prairie, MN (US)

( * ) Notice: Subject to any disclaimer, the term of this patent is extended or adjusted under 35 U.S.C. 154(b) by 0 days.

(21) Appl. No.: 09/505,019

(22) Filed: Feb. 16, 2000

(51) Int. Cl.$^7$ ............... G02B 6/28; G02B 6/32
(52) U.S. Cl. ............... 385/24; 385/27; 385/33; 385/47
(58) Field of Search ............... 385/24, 47, 48, 385/27, 39, 50, 33

(56) References Cited

U.S. PATENT DOCUMENTS

| | | | |
|---|---|---|---|
| 4,486,071 A | * 12/1984 | Levinson | |
| 4,548,478 A | 10/1985 | Shirasaki | |
| 4,653,042 A | 3/1987 | d'Auria et al. | |
| 4,707,057 A | * 11/1987 | Takahashi et al. | |
| 4,712,880 A | 12/1987 | Shirasaki | |
| 5,214,728 A | 5/1993 | Shigematsu et al. | |
| 5,237,445 A | 8/1993 | Kuzuta | 359/281 |
| 5,255,332 A | 10/1993 | Welch et al. | |
| 5,262,892 A | 11/1993 | Nakamura | 359/484 |
| 5,381,261 A | 1/1995 | Hirai et al. | 359/282 |
| 5,402,509 A | 3/1995 | Fukushima | 385/33 |
| 5,588,078 A | * 12/1996 | Cheng et al. | 385/33 |
| 5,629,995 A | * 5/1997 | Duck et al. | 385/24 |
| 5,754,321 A | 5/1998 | Giles et al. | |
| 5,822,095 A | * 10/1998 | Taga et al. | 359/127 |
| 5,825,950 A | 10/1998 | Cheng | |
| 5,917,648 A | 6/1999 | Harker | |
| 5,930,039 A | 7/1999 | Li et al. | |
| 6,002,503 A | 12/1999 | Mizrahi | |
| 6,289,152 B1 | * 9/2001 | Zhang et al. | 385/33 |
| 6,297,896 B1 | * 10/2001 | Kikuchi et al. | 359/128 |
| 6,310,718 B1 | 10/2001 | Saeki | |
| 6,370,296 B1 | * 4/2002 | Cao | 385/24 |

FOREIGN PATENT DOCUMENTS

| | | | |
|---|---|---|---|
| EP | 0115443 A2 | * 8/1984 | |
| EP | 0325152 A2 | * 7/1989 | 385/47 |
| EP | 0 779 687 A2 | 6/1997 | |
| EP | 0 878 722 A1 | 11/1998 | |
| EP | 0 964 275 A1 | 12/1999 | |
| EP | 0 994 595 A2 | 4/2000 | |
| EP | 1 024 541 A2 | 6/2000 | |
| FR | 2 775 795 | 9/1999 | |
| JP | 11 145538 | 5/1999 | |
| JP | 11 145540 | 5/1999 | |
| JP | 11 215058 | 8/1999 | |
| WO | WO 01/61402 A1 | 8/2001 | |

* cited by examiner

*Primary Examiner*—Rodney Bovernick
*Assistant Examiner*—Mike Stahl
(74) *Attorney, Agent, or Firm*—Altera Law Group, LLC

(57) ABSTRACT

A fiber optic device is used by fiber optic systems that operate with light at more than one wavelength. The device may be inserted anywhere within the fiber network. The fiber optic device permits the separation of the wavelengths so that an optical device can operate on that separated wavelength without operating on the other wavelength or wavelengths. The different wavelengths may then be recombined. In another embodiment, different wavelengths may be combined into a single fiber, with an optical device being disposed to operate on one of the wavelengths.

35 Claims, 13 Drawing Sheets

FIBER OPTIC DEVICE OPERATING AT TWO OR MORE WAVELENGTHS

FIELD OF THE INVENTION

The present invention is directed generally to a fiber optic device, and more particularly to a fiber optic device that operates at two wavelengths.

BACKGROUND

Optical fibers find many uses for directing beams of light between two points. Optical fibers have been developed to have low loss, low dispersion, and polarization maintaining properties and can also act as amplifiers. As a result, optical fiber systems find widespread use, for example in optical communication applications.

However, one of the important advantages of fiber optic beam transport, that of enclosing the optical beam within a fiber to guide it between terminal points, is also a limitation. Many types of optical device need to be included in a fiber optic system to control or otherwise regulate the flow of light from one point to another, such as filters, optical switches, circulators, and the like. Many of these devices are typically implemented in a bulk form, rather than in a waveguide form, requiring that the light must freely propagate through the device. Consequently, the inclusion of an optical device necessitates that the optical fiber system have a section where the beam path propagates freely in space, rather than being guided within a fiber.

Furthermore, it is not uncommon to find that an optical fiber supports the transport of light at two or more wavelengths. For example, the communications signal propagating along the fiber may have a wavelength of about 1.55 $\mu$m, while a diagnostic signal may also be sent along the fiber, having a wavelength of approximately 1.3 $\mu$m. Other wavelengths that may be used. in the same fiber as the communications signal include a pump signal for pumping an optical amplifier. For example, where the optical signal is at about 1.55 $\mu$m, the pump signal may be at about 980 nm for pumping an erbium-doped fiber amplifier, or at about 1.48 $\mu$m for pumping a fiber Raman amplifier. It is common that an optical device be inserted in an optical fiber system to operate on light at only one of the wavelengths present. It may also be the case that different operations have to be applied to light at different wavelengths.

Accordingly, there is a need for fiber optic devices that can operate in fiber-based systems that have light propagating within the fiber at more than one wavelength.

SUMMARY OF THE INVENTION

Generally, the present invention relates to a device for use in fiber optic systems that operate with light at more than one wavelength. The device may be inserted anywhere within the fiber network. One particular embodiment of the invention permits the separation of the wavelengths so that an optical device can operate on that separated wavelength without operating on the other wavelength or wavelengths. The different wavelengths may then be recombined. In another embodiment of the invention, different wavelengths may be combined into a single fiber, with an optical device being disposed to operate on one of the wavelengths.

One particular embodiment of the invention is a fiber optic device that includes a first optical fiber optically coupled to transmit light at first and second wavelengths along a first optical path and a wavelength separator disposed on the first optical path which is adapted to direct light at the first wavelength along a second optical path and light at the second wavelength along a third optical path different from the second optical path. A wavelength combiner is optically coupled to combine light propagating along the second and third optical paths into a fourth optical path and a second optical fiber is optically coupled to the fourth optical path. A first optical device disposed along the second optical path, between the wavelength separator and the wavelength combiner to operate on light at the first wavelength. In different variations, the first optical device may be, for example, an optical modulator, a switch, an optical filter, or a circulator.

In another embodiment of the invention, a fiber optic device includes wavelength splitting means for splitting a light beam into a first light beam containing light at a first wavelength and a second light beam containing light at a second wavelength, the first and second beams respectively propagating along first and second beam paths. A first optical device is disposed on the first beam path to operate on the first light beam. The fiber optic device also includes wavelength combining means for combining light propagating in the first direction along the first beam path, and light propagating in the first direction along the second beam path into a single output beam.

In another embodiment of the invention, first and second optical fibers are optically coupled via first and second optical paths respectively to a wavelength combiner. Light at a first wavelength from the first optical fiber is combined with light at a second wavelength from the second fiber at the wavelength combiner to form a combined output beam. A third optical fiber is coupled via a third optical path to receive the combined output beam from the wavelength combiner. A first optical device is positioned on the first optical path between the first optical fiber and the wavelength combiner.

In another embodiment of the invention, a first optical fiber is optically coupled via a first optical path to a wavelength separator to transmit light to the wavelength separator which is arranged to separate light received from the first optical fiber into components at first and second wavelengths. A second optical fiber is coupled via a second optical path to the wavelength separator to receive light at the first wavelength. A third optical fiber is coupled via a third optical path to the wavelength separator to receive light at the second wavelength, and a first optical device is positioned on the second optical path between the second optical fiber and the wavelength separator.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
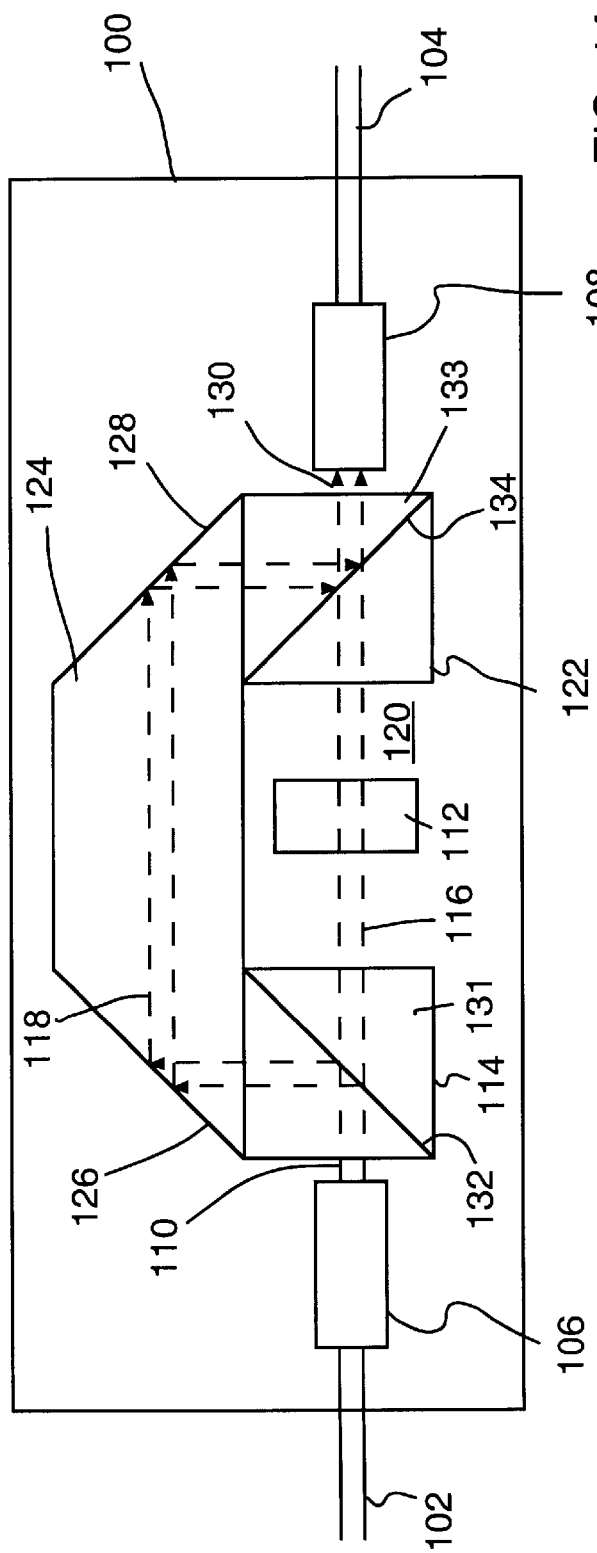
FIG. 1A schematically illustrates a multiwavelength fiber optic device according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical fiber systems, and is believed to be particularly suited to optical fiber communication systems in which light propagates along the fiber at more than one wavelength.

Figure 14:
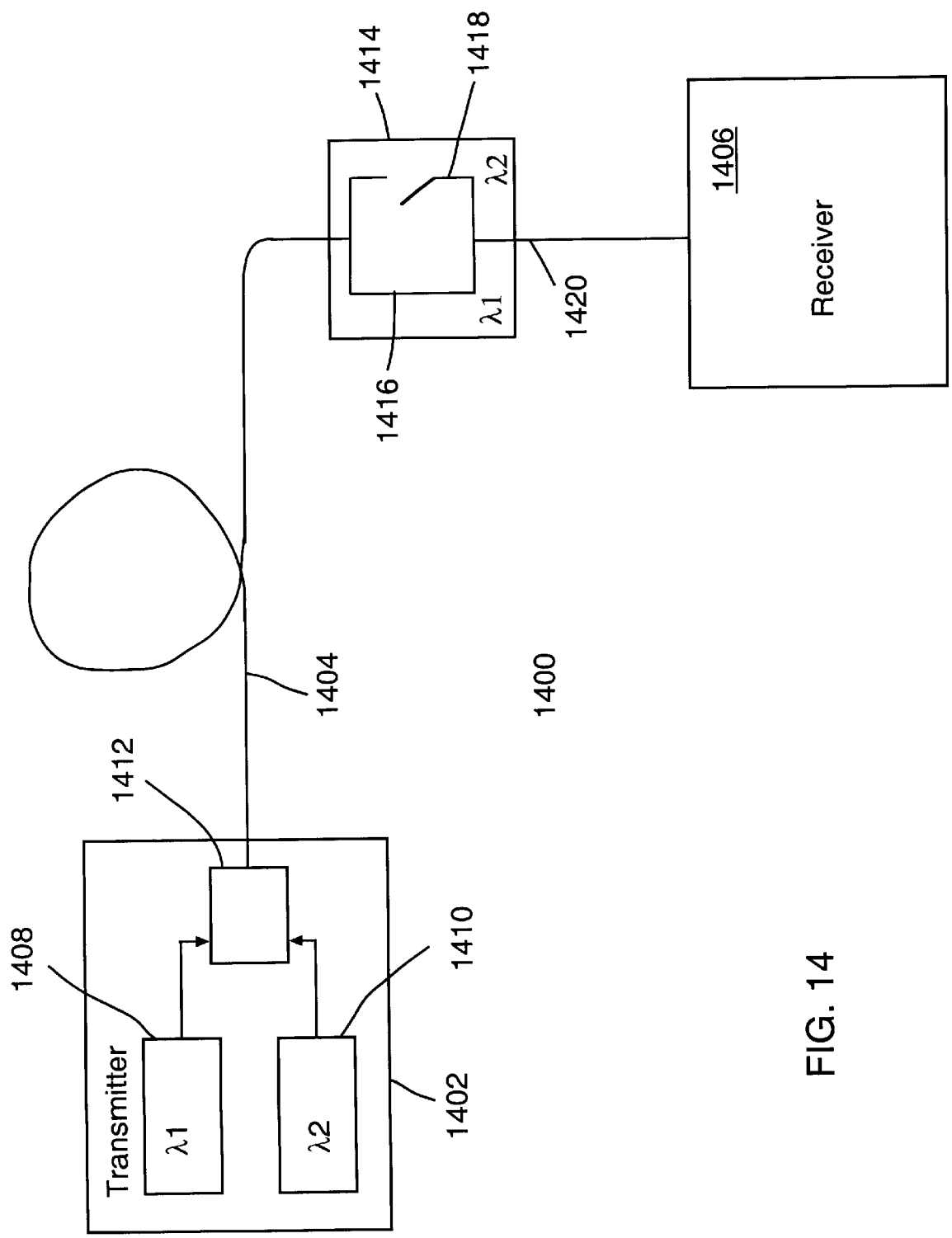
FIG. 14 schematically illustrates a fiber optic communications system.

A fiber system 1400 operating at more than one wavelength is illustrated in FIG. 14. The fiber system 1400 includes a transmitter 1402, and fiber communication channel 1404 and a receiver 1406. The transmitter 1402 includes two light sources 1408 and 1410 operating at different wavelengths, $\lambda 1$ and $\lambda 2$, or wavelength bands, respectively. For example, the first source 1408, operating at $\lambda 1$, is a communications signal at approximately 1550 nm, and may be a band of individual wavelengths at about 1550 nm, such as a multiplexed optical communications signal. The second source 1410 operating at $\lambda 2$ may be, for example, a diagnostic signal at 1.3 $\mu$m, or may be a pump laser for pumping a fiber amplifier. The outputs from the light sources 1408 and 1410 are combined in a combiner 1412 and launched into the fiber channel 1404.

It may be desired that, at some point in the fiber channel, there be a switch that prevents any signal at $\lambda 2$ from proceeding any further along the fiber 1404, without affecting the flow of the signal at $\lambda 1$. This is achieved using a device 1414 that splits the light beam of combined wavelengths into two paths, one path 1416 for light at $\lambda 1$ and the other path 1418 for light at $\lambda 2$. The two paths 1416 and 1418 are combined into a single output 1420.

The second path 1418 contains an optical switch 1422 that may be opened so as to prevent the passage of the light at $\lambda 2$. However, if it is desired that light at $\lambda 2$ passes through the device 1414, the switch 1422 may be closed. Therefore, the device 1414 permits the components of light passing along the fiber 1404 to be separated, so that an optical operation, such as modulation, filtering, switching or the like may be carried out on one of the wavelength components without affecting the other wavelength component.

Figure 1B:
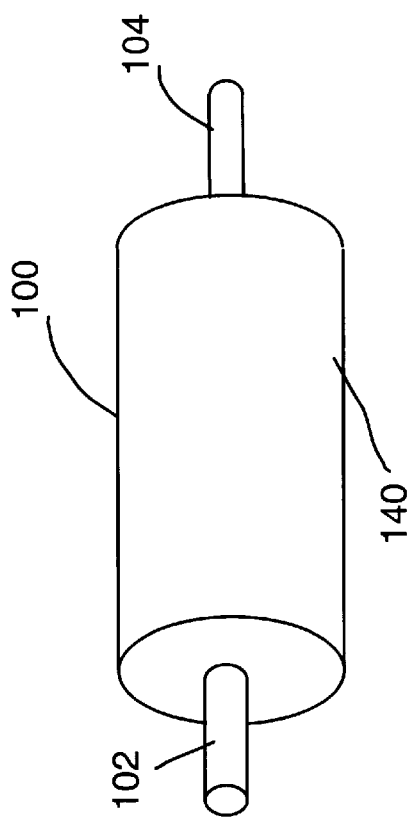
FIG. 1B schematically illustrates an in-line fiber optic device.

One particular embodiment of a fiber optic device operating at more than one wavelength is schematically illustrated in FIG. 1A. The device 100 has two fibers 102 and 104 that couple to the external fiber optic system. The device 100 is in an "in-line" configuration, having one fiber at each end. An advantage of this configuration is that the overall width of the device package is small. A view of the "in-line" package is illustrated in FIG. 1B, illustrating the device housing 140, with the two fibers 102 and 104 attached at either end of the housing 140. If the optical device 112 is an active device that requires external control, for example a modulator or a switch, then the housing 140 may also contain a connection to the optical device 112.

Each fiber 102 and 104 is terminated by a respective collimating lens 106 and 108 to reduce coupling losses between the two fibers 102 and 104. Light 110 propagating from the first fiber 102 may contain one or more wavelength components. For the present discussion, it is assumed that two wavelength components are present, namely $\lambda 1$ and $\lambda 2$. Light at $\lambda 1$ may be, for example, a communications signal at 1.55 $\mu$m, while the light at $\lambda 2$ is pump light for an amplifier, such as 1.48 $\mu$m or 980 nm.

In the particular embodiment shown, it is desired that an optical device 112 operate only on the light at one wavelength, $\lambda 1$, while the optical device 112 does not operate on the light at $\lambda 2$. Accordingly, the wavelength components $\lambda 1$ and $\lambda 2$ are separated by a wavelength separator 114 into two components 116 and 118 respectively, propagating along different optical paths. The first component 116, at $\lambda 1$, is transmitted by the wavelength separator 114 and propagates through the first free space region 120 between the wavelength separator 114 and the wavelength combiner 122. The first wavelength component 116 passes through the optical device 112 positioned in the free space region 120.

The second wavelength component 118 is directed from the wavelength separator 114 along a path different from the path of the first wavelength component 116. A guiding prism 124 has two reflective surfaces 126 and 128 that direct the second wavelength component 118 to the wavelength combiner 122, where the first and second wavelength components 116 and 118 are combined into a single output beam 130 that propagates to the second collimating lens 108 and is focused into the second fiber 104. The prism 124 may be, for example, a roof-top prism.

The figure illustrates only light passing from the first fiber 102 to the second fiber 104. It will be appreciated that light may also pass from the second fiber 104 to the first fiber 102.

The wavelength separator 114 is any device that separates the light beam 110 into two wavelength components. In the particular embodiment illustrated, the wavelength separator is a beamsplitter cube 131 having a dichroic reflector 132 that transmits light at one wavelength, $\lambda 1$, and reflects light at the other wavelength, $\lambda 2$. The wavelength combiner 122 may be the same device as the wavelength separator 114, only operating in reverse. In the embodiment shown, the wavelength combiner 122 is a beamsplitter cube 133 that includes a dichroic reflector 134 that transmits the light at $\lambda 1$, and reflects the light at $\lambda 2$.

Other types of wavelength separator and combiner may also be employed. For example, the wavelength separator may be a dispersing prism that separates light at different wavelengths into different paths. Such a prism also operates as a wavelength combiner, wherein light at different wavelengths introduced into the prism at selected angles emerges at the same angle. Another type of wavelength separator and/or combiner may be a diffraction grating.

Figure 2:
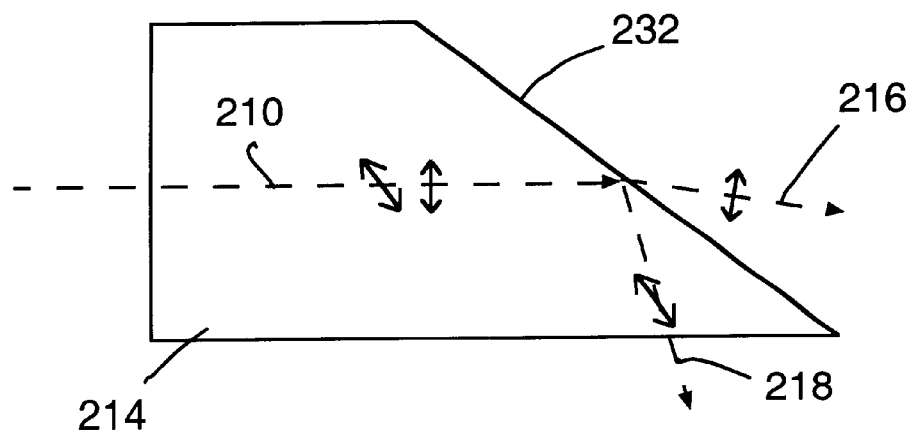
FIG. 2 schematically illustrates a polarization based wavelength separator.

The wavelength separator and/or combiner may also operate on a principle that depends on the polarization of light, for example as illustrated in FIG. 2. The separator 214 is formed from a birefringent material. The single light beam 210 propagates within the separator to the reflecting surface 232. The first wavelength component 216 propagates in a first polarization, with an associated first refractive index n1. The second wavelength component 218 propagates through in a second polarization, orthogonal to the first polarization, with an associated second refractive index n2, where n2>n1. The surface 232 is cut at such an angle that the second wavelength component 218 is totally internally reflected, whereas the first wavelength component is transmitted at the surface 232. It will be appreciated that such a polarization dependent device may also be used to combine light of different wavelengths, having different polarizations.

The guiding prism 124 is provided to direct the second wavelength component 118 from the wavelength separator 114 to the wavelength combiner 122. It will be appreciated that other components may also be provided to serve this function. For example, two separate mirrors placed at the positions of the reflecting surface 126 and 128 of the prism may be used as a substitute for the prism 124.

The optical device 112 may be any type of device which is to operate on the first wavelength component 116 without operating on the second wavelength component 118. The optical device may be, for example, a filter, an optical switch, a circulator, an isolator, a modulator, or the like.

Figure 3:
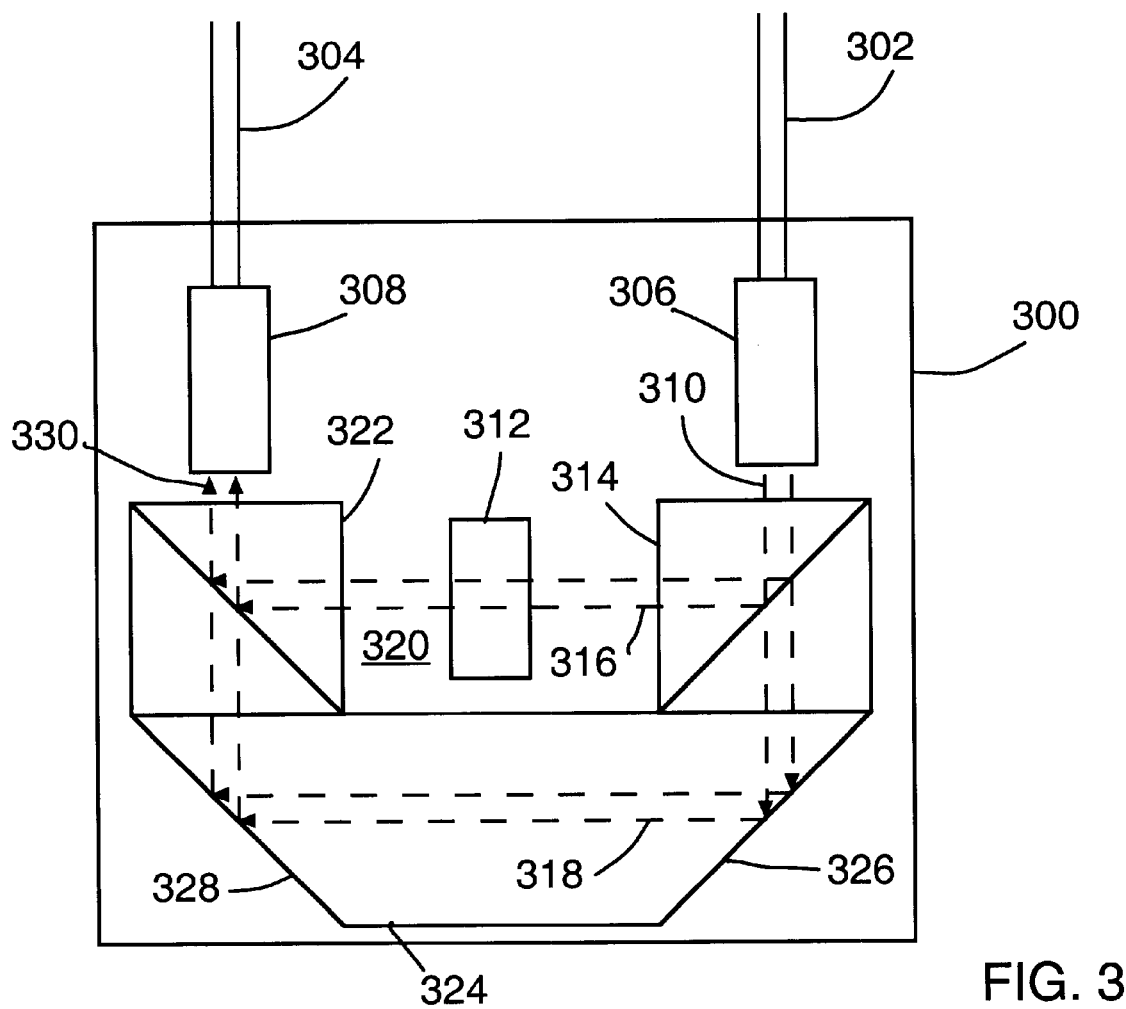
FIG. 3 schematically illustrates an embodiment of a multiwavelength fiber optic device according to the present invention.

Another particular embodiment of a fiber optic device operating at more than one wavelength is illustrated in FIG. 3. The device 300 has two fibers 302 and 304 that couple to the external fiber optic system. The device 300 is in a "terminal" configuration, having both fibers 302 and 304 enter the package from the same side. An advantage of this configuration is that the length of the space required by the device is less than that for the "in-line" configuration of FIG. 1, since the fibers connecting to the device have a limited radius of curvature.

Each fiber 302 and 304 is terminated by a respective collimating lens 306 and 308 to reduce coupling losses between the two fibers 302 and 304. Light 310 propagating from the first fiber 302 contains two wavelength components, λ1 and λ2, which are separated by a wavelength separator 314 into two components 316 and 318 respectively, propagating along different optical paths. The first component 316, at λ1, is reflected by the wavelength separator 314 and propagates through the free space region 320 between the wavelength separator 314 and the wavelength combiner 322. The first wavelength component 316 passes through the optical device 312 positioned in the free space region 320.

The second wavelength component 318 is directed from the wavelength separator 314 along a path different from the path of the first wavelength component 316. A guiding prism 324 has two reflective surfaces 326 and 328 that direct the second wavelength component 318 to the wavelength combiner 322, where the first and second wavelength components 316 and 318 are combined into a single output beam 330 that propagates to the second collimating lens 308 and is focused into the second fiber 304.

Figure 4A:
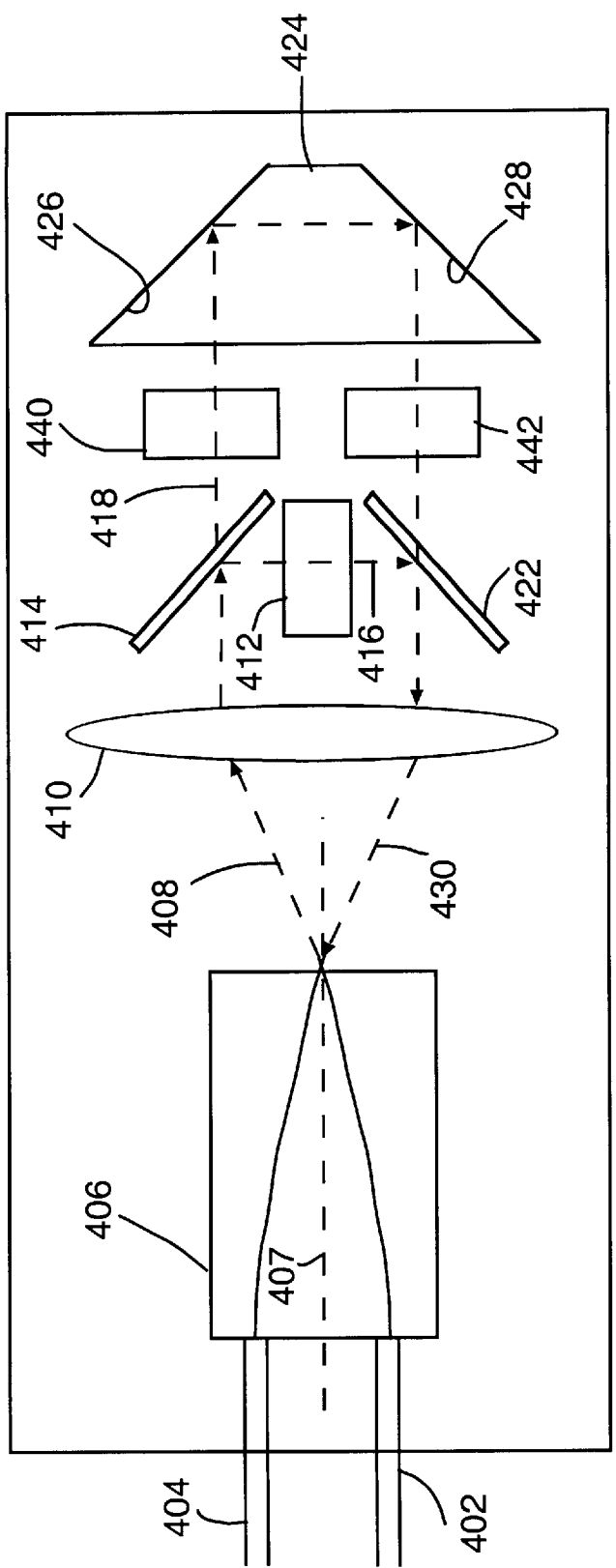
FIG. 4A schematically illustrates another embodiment of a multiwavelength fiber optic device according to the present invention.
Figure 4B:
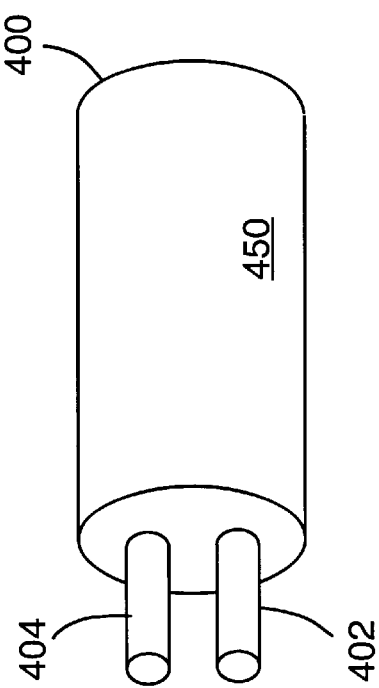
FIG. 4B schematically illustrates a terminal fiber optic device.

Another particular embodiment of a fiber optic device operating at more than one wavelength, and in a "terminal" configuration, is illustrated schematically in FIG. 4A. Two fibers 402 and 404 couple the device 400 to the external fiber system. A view of the "terminal" package is illustrated FIG. 4B, illustrating the housing 450 with the fibers 402 and 404 connecting at the same end. If the optical device 412 is an active device that requires external control, for example a modulator or a switch, then the housing 450 may also contain a connection to the optical device 412.

The two fibers 402 and 404 share a single collimating lens 406, which is typically a gradient index (GRIN) lens. The output beam 408 from the first fiber 402 exits collimated from the collimating lens 406, but propagating at an angle relative to the axis 407 of the lens 406. A parallelizing optic 410 may be used to divert the beam 408 to be parallel to the axis 407. The parallelizing optic 410 may be, for example, a lens or a prism.

The collimated beam 408 is incident on a wavelength separator 414, which, in this particular embodiment, is a dichroic mirror on a substrate. The wavelength separator 414 reflects the first wavelength component 416 at λ1, and transmits the second wavelength component 418 at λ2. The two wavelength components are recombined at the wavelength combiner 422, which may be a dichroic mirror on a substrate. The first wavelength component 416 at λ1 passes through the first optical device 412 between the wavelength separator and combiner 414 and 422.

The second wavelength component 418 at λ2 is directed by a reflecting surfaces 426 and 428 of a prism 424 to the wavelength combiner 422, where the two different wavelength components 416 and 418 are recombined. The second wavelength component 418 may pass through one or more optical devices 440 and 442 before recombining with the first wavelength component 416.

Figure 5:
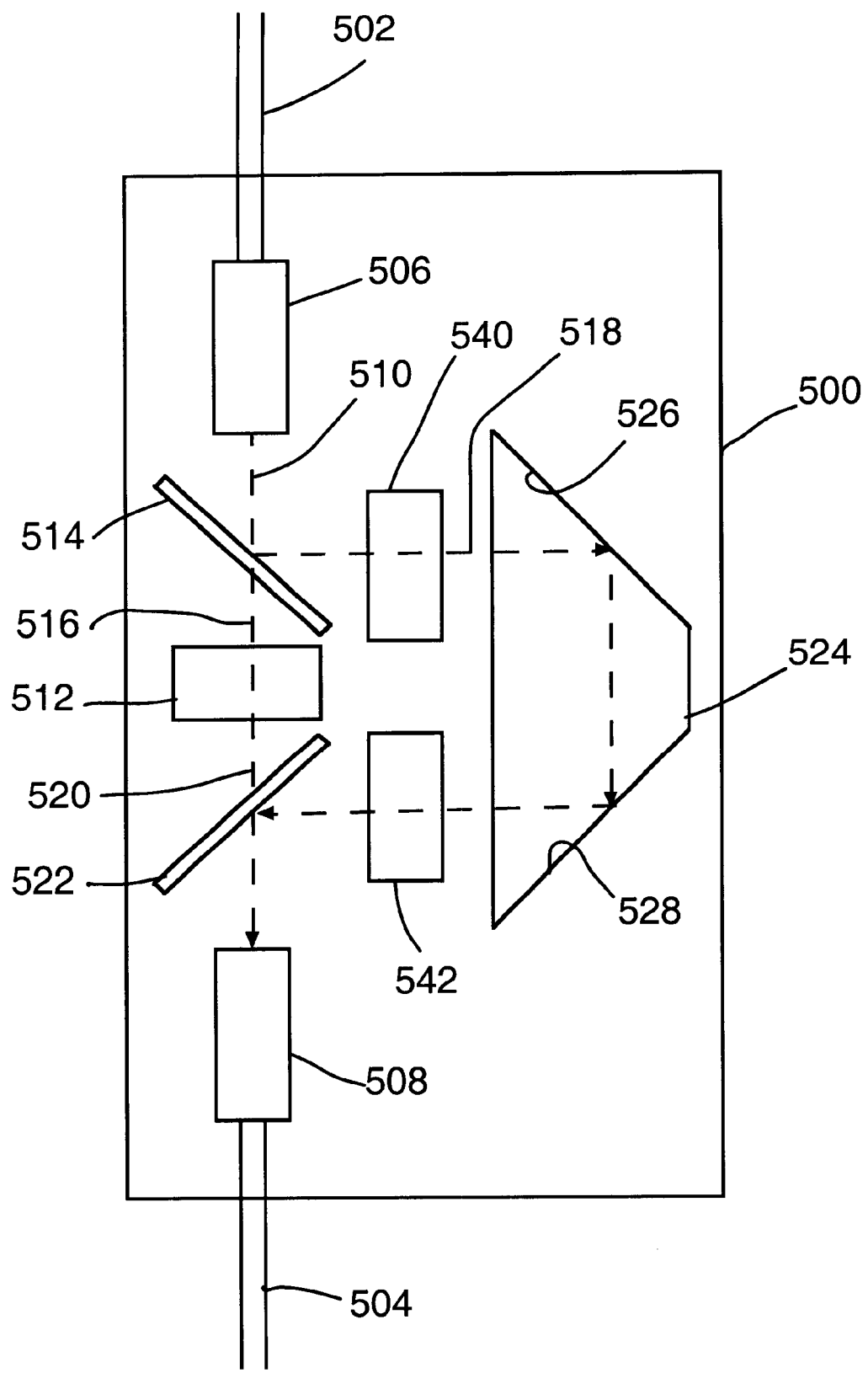
FIGS. 5–8 schematically illustrate additional embodiments of a multiwavelength fiber optic device according to the present invention.

Another particular embodiment of a fiber optic device 500 operating at more than one wavelength is illustrated in FIG. 5. The device 500 employs similar components for separating and combining the different wavelength components as in the device 400, but in an "in-line" configuration. Two fibers 502 and 504 couple the device 500 to the external fiber system. The two fibers 502 and 504 each have a respective collimating lens 506 and 508, which may be a GRIN lens.

The collimated output beam from the first fiber 502 is incident on a wavelength separator 514, which, in this particular embodiment, is a dichroic mirror on a substrate. The wavelength separator 514 transmits the first wavelength component 516 at λ1, and reflects the second wavelength component 518 at λ2. The two wavelength components 516 and 518 are recombined at the wavelength combiner 522, which may be a dichroic mirror on a substrate. The first wavelength component 516 at λ1 passes through the first optical device 512 positioned in the space 520 between the wavelength separator and combiner 514 and 522.

The second wavelength component 518 at λ2 is directed by a reflecting surfaces 526 and 528 of a prism 524 to the wavelength combiner 522, where the two different wavelength components 516 and 518 are recombined. The second wavelength component 518 may pass through one or more optical devices 540 and 542 before recombining with the first wavelength component 516.

Figure 6:
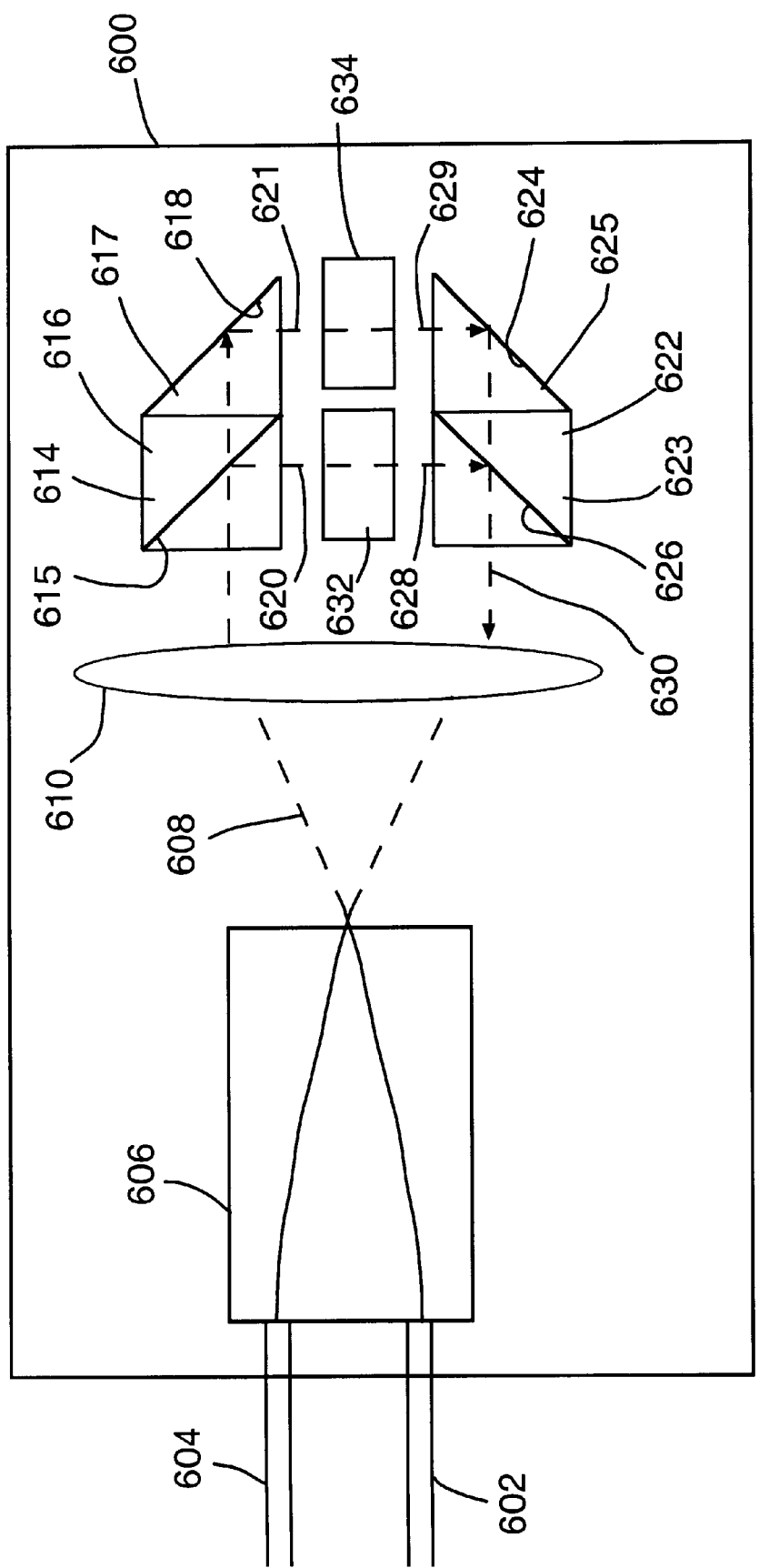

Another particular embodiment of a fiber optic device 600 operating at more than one wavelength is illustrated in FIG. 6. This embodiment uses a different type of wavelength separator and combiner and has a "terminal" configuration.

Two fibers 602 and 604 couple the device 600 to the external fiber system. The two fibers 602 and 604 share a single collimating lens 606 and a parallelizing optic 610 in a manner as described above with regard to FIG. 4.

The collimated beam 608 output from the first fiber 602 is incident on a wavelength separator 614, which, in this particular embodiment, includes a beamsplitter cube 616 and a turning prism 617. A dichroic reflector 615 in the beamsplitter cube 616 reflects the first wavelength component 620 at λ1 and transmits the second wavelength component 621 at λ2. The reflecting face 618 of the turning prism 617 reflects the second wavelength component 621 to be parallel to the first wavelength component 620.

The two wavelength components 620 and 621 are recombined at the wavelength combiner 622, which is similar to the wavelength separator, having a beamsplitting cube 623 and a turning prism 625. The reflecting face 624 of the turning prism 625 reflects the second wavelength component 621 so that it recombines with the first wavelength component 620 at the dichroic reflector 626 of the beamsplitting cube 623. The combined output beam 630 passes through the parallelizing optic 610 and is focused by the collimating lens 606 into the second fiber 604.

This arrangement provides a free space propagation region between the wavelength separator 614 and the wavelength combiner 622 which allows the placement of a first optical device 632 in the path of the first wavelength component 620 and a second optical device 634 in the path of the second wavelength component 621.

Figure 7:
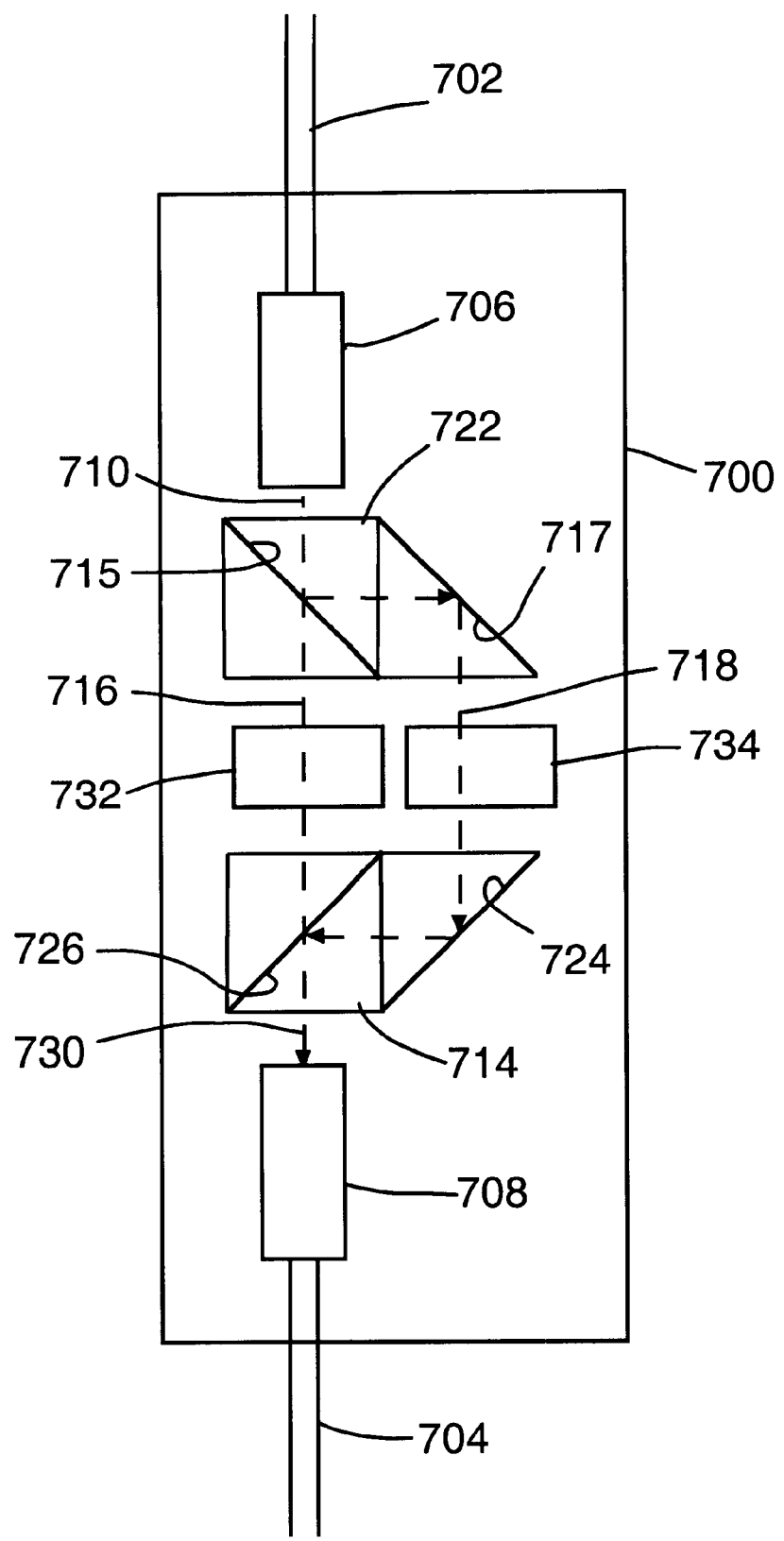

Another particular embodiment of a fiber optic device 700 operating at more than one wavelength is illustrated in FIG. 7. This embodiment uses a wavelength separator and combiner that are similar to those described above in FIG. 6, but is arranged in an "in-line" configuration.

Two fibers 702 and 704 couple the device 700 to the external fiber system. The two fibers 702 and 704 each have respective collimating lenses 706 and 708. The collimated beam 710 output from the first fiber 702 is incident on a wavelength separator 722, which reflects the first wavelength component 716 at a dichroic surface and reflects the second wavelength component 718 at an internal prism surface 717.

The two wavelength components 716 and 718 are recombined at the wavelength combiner 714, which is similar to the wavelength separator 722. The second wavelength component 718 is reflected at a prism surface 724, and recombined with the first wavelength component 716 at a dichroic reflector 726 which transmits the first wavelength component 716 and reflects the second wavelength component 718. The combined output beam 730 propagates to the collimating lens 708 and is focused into the second fiber 704.

This arrangement provides a free space propagation region between the wavelength separator 722 and the wavelength combiner 714 which allows the placement of a first optical device 732 in the path of the first wavelength component 716 and a second optical device 734 in the path of the second wavelength component 718.

Figure 8:
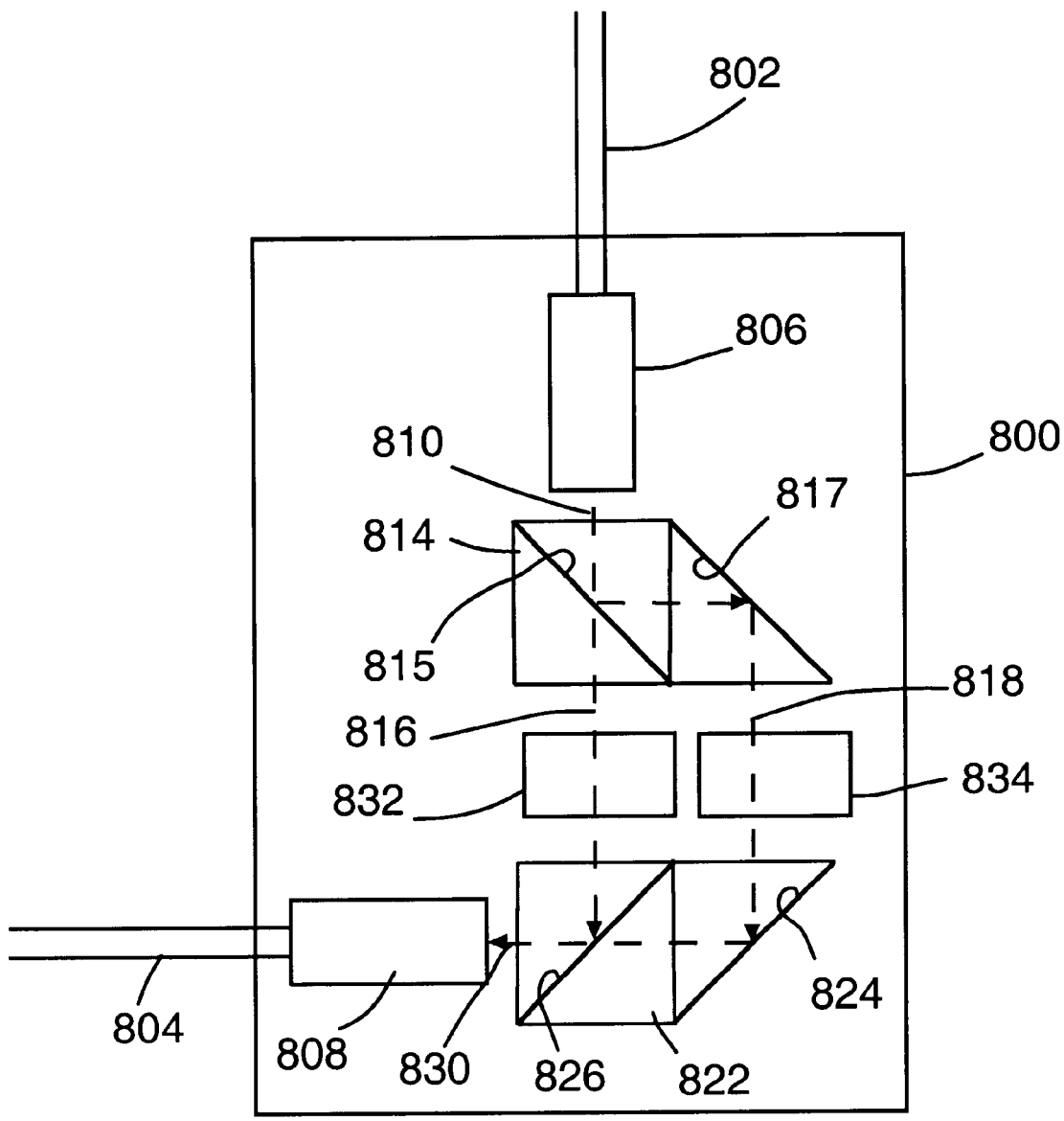

Another particular embodiment of a fiber optic device 800 operating at more than one wavelength is illustrated in FIG. 8. This embodiment uses a wavelength separator and combiner that are similar to those described above in FIG. 6, but is arranged in a "corner" configuration, in which one coupling fiber is positioned at an angle relative to the other, unlike the previously described embodiments where the coupling fibers are substantially parallel. This arrangement may be useful in applications where the fiber arrangements of the "in-line" or "terminal" configurations are unsuitable, for example because of limited availability of space to accommodate the minimum bending radius of a fiber.

Two fibers 802 and 804 couple the device 800 to the external fiber system. The two fibers 802 and 804 each have respective collimating lenses 806 and 808. The collimated beam 810 output from the first fiber 802 is incident on a wavelength separator 814, which transmits the first wavelength component 816 at a dichroic reflector 815. The second wavelength component 818 is reflected at the dichroic reflector to a reflecting surface 817, in this case an internally reflecting prism surface, which reflects the second wavelength component 181 to a reflecting surface 824 of the wavelength combiner 822.

The two wavelength components 816 and 818 are recombined at the wavelength combiner 822, which is similar to the wavelength separator 814, except that the dichroic reflector 826 reflects the first wavelength component 816 and transmits the second wavelength component 818. The combined output beam 830 propagates to the collimating lens 808 and is focused into the second fiber 804.

This arrangement provides a free space propagation region between the wavelength separator 814 and the wavelength combiner 822 which allows the placement of a first optical device 832 in the path of the first wavelength component 816 and a second optical device 834 in the path of the second wavelength component 818.

Figure 9:
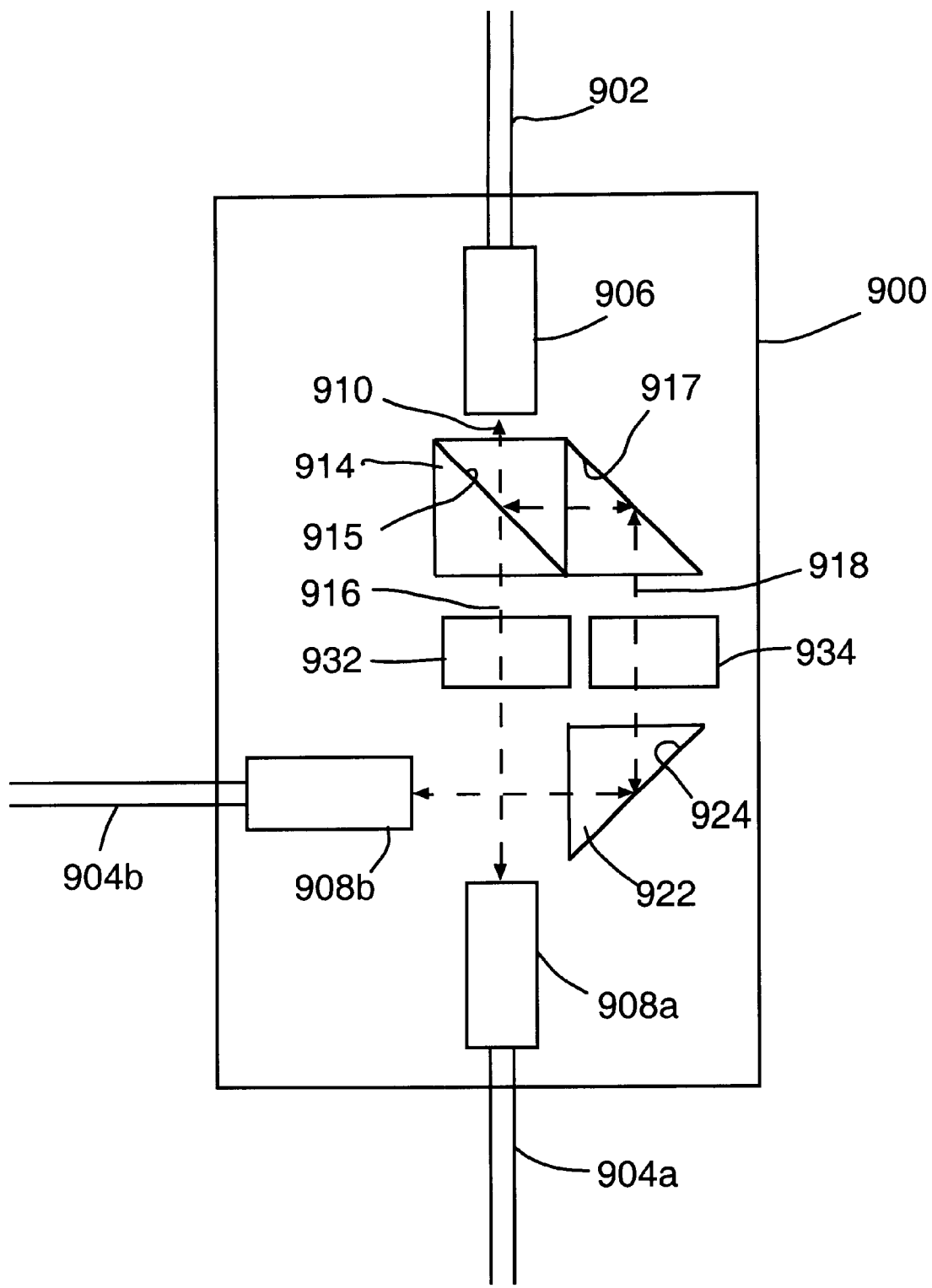
FIGS. 9 and 10 schematically illustrate embodiments of a multiple wavelength separator/combiner device according to the present invention.

Another particular embodiment of a fiber optic device 900 operating at more than one wavelength is illustrated in FIG. 9. This embodiment is a variation of the embodiments illustrated in FIGS. 7 and 8, and may be used for separating or combining different wavelength components. This embodiment is arranged in a "corner" configuration.

Three fibers 902, 904a and 904b couple the device 900 to the external 15 fiber system. Each fiber 902, 804a and 904b has a respective collimating lens 906, 908a and 908b. Like all the other embodiments described, light may pass through the device in both directions. Here, we initially describe passage of light from the first fiber 902 to the other fibers 904a and 904b. The collimated beam 910 output from the first fiber 902 is incident on a wavelength separator 914, which reflects the first wavelength component 916 at a dichroic surface 915 and reflects the second wavelength component 918 at an internal prism surface 917.

The first wavelength component 916 propagates through the first optical device 932 and passes to the second fiber 904a via the collimating lens 908a. The second wavelength component 918 is separated from the first wavelength component 916 by reflection at the dichroic reflector 915. The second wavelength component 918 is directed by the reflecting surface 917 to the third collimating lens 908b and the third fiber 904b. The second wavelength component 918 may be directed via a first reflecting surface 917 and a second reflecting surface 924. A second optical device 934 may be placed in the path of the second wavelength component 918.

It will be appreciated that the device 900 may be used for separating wavelength components as just described, and also for combining wavelength components. For example, a first wavelength component propagating from the second fiber 904a to the first fiber 902 may be combined at the dichroic reflector 915 with a second wavelength component propagating from the third fiber 904b. The combined beam, containing both wavelength components, propagates to the first fiber 902, where it is coupled to an external fiber system.

The different fibers may be positioned differently from the "in-line/corner" arrangement illustrated in FIG. 9. For example, the third fiber 904b may be positioned parallel to the second fiber 904a, as illustrated for the device 1000 in FIG. 10. Here, the turning prism 922 is omitted, so that the second wavelength component 918 enters the third fiber 904b in a direction parallel to the first wavelength component 916.

Figure 10:
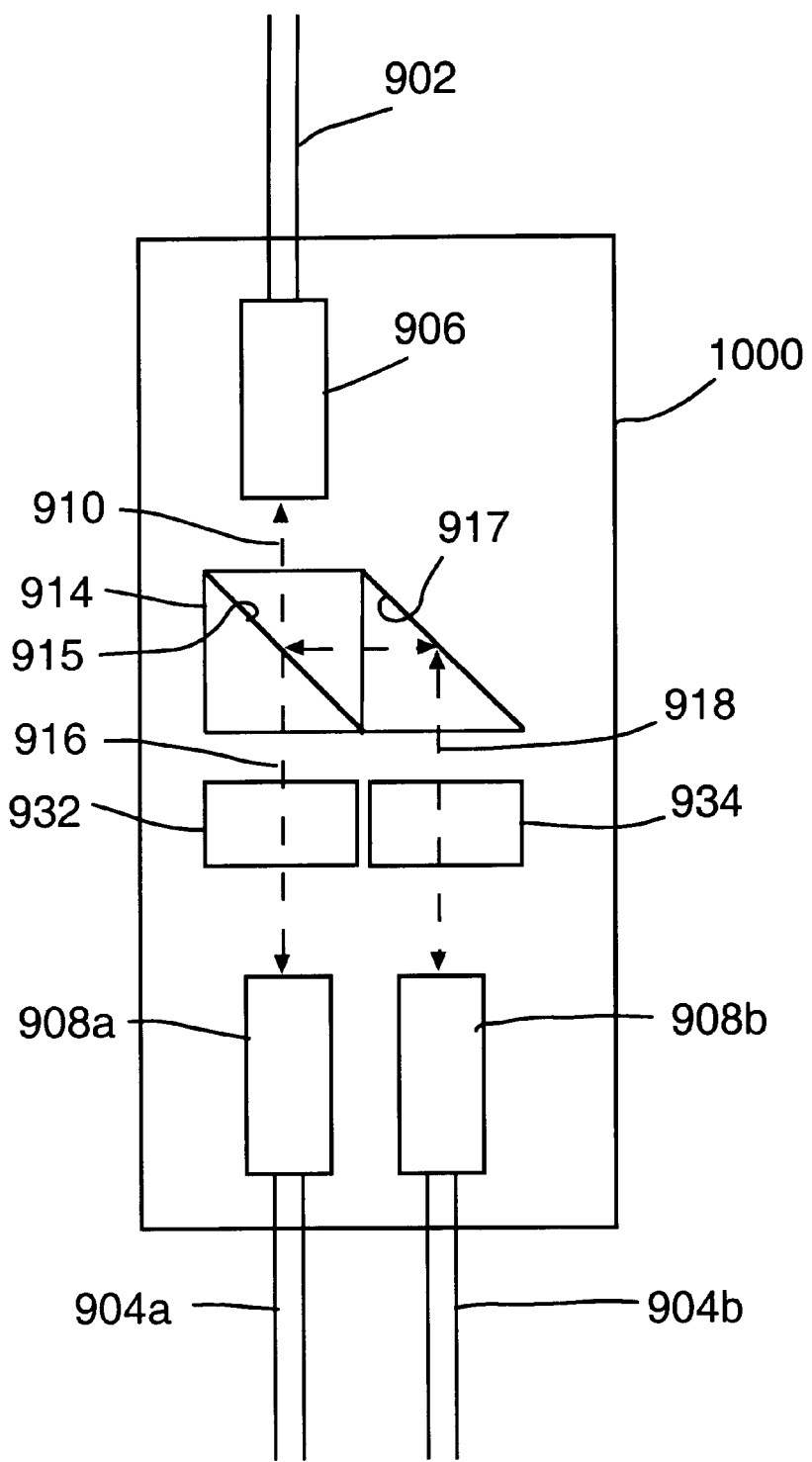

The "in-line" arrangement of FIG. 10 provides an advantage over the embodiment illustrated in FIG. 9 in that the overall package size for the device may be reduced.

It will be appreciated that many different configurations may be adopted for a fiber optic device that combines different wavelengths or separates different wavelengths. For example, the turning prism having the reflecting face 917 may be omitted altogether, and the third fiber positioned to receive or direct the second wavelength component directly from or to the dichroic reflector 915. Also, different reflecting surfaces may be included in the fiber optic device 1000 so that the second and third fiber are both on the same side of the fiber optic device, for example in a "corner" configuration or in a "terminal" configuration. Furthermore, the second and third fibers may terminate on different sides of the fiber optic device, for example in a "T" configuration, with any of the fibers forming the base of the "T", or in a mixed configuration, with two fibers on the same side and the third fiber on a different side of the device 1000.

Figure 11:
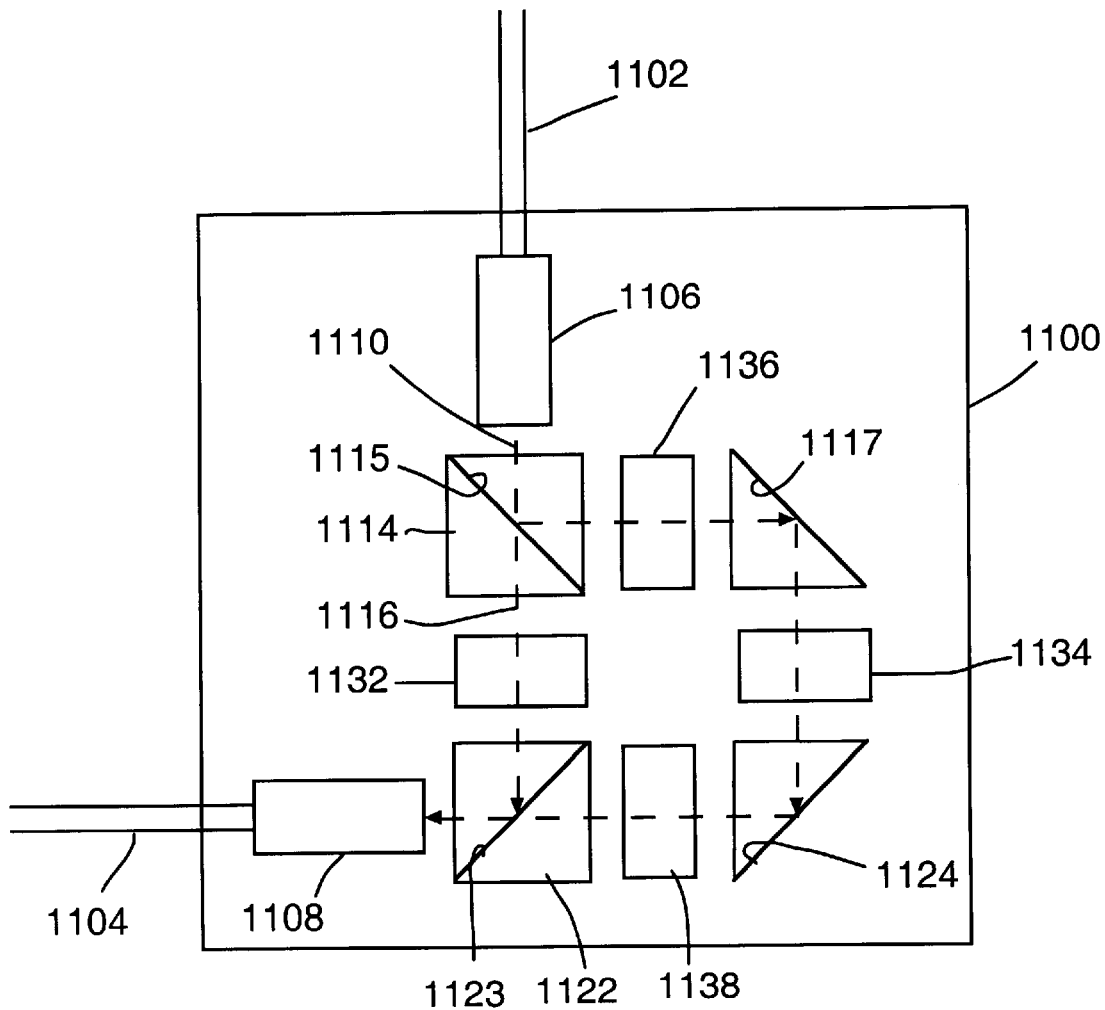
FIG. 11 schematically illustrates an embodiment of a multiwavelength fiber optic device according to the present invention.

Another particular embodiment of a fiber optic device 1100 operating at more than one wavelength is illustrated in FIG. 11. This embodiment has some similarities to the embodiment illustrated in FIG. 8, but provides additional capabilities for inserting different optical devices for at least one of the wavelength components.

Two fibers 1102 and 1104 couple the device 1100 to the external fiber system. The two fibers 1102 and 1104 each have respective collimating lenses 1106 and 1108. The collimated beam 1110 output from the first fiber 1102 is incident on a wavelength separator 1114, which transmits the first wavelength component 1116 and reflects the second wavelength component 1118 at a dichroic reflector 1115. The second wavelength component 1118 is reflected by to reflectors 1117 and 1124 to the wavelength combiner 1122. In this case, the reflectors 1117 and 1124 are internally reflecting prism surfaces, but may also be other types of reflectors.

The two wavelength components 1116 and 1118 are recombined at the wavelength combiner 1122, which is similar to the wavelength separator 1114, except that the first wavelength component 1116 is reflected at the dichroic reflector 1123 and the second wavelength component 1118 is transmitted through the dichroic reflector 1123. The combined output beam 1130 propagates to the collimating lens 1108 and is focused into the second fiber 1104.

This arrangement provides different positions where different optical devices 1132, 1134, 1136 and 1138 may be inserted to operate on the respective wavelength components.

Figure 12:
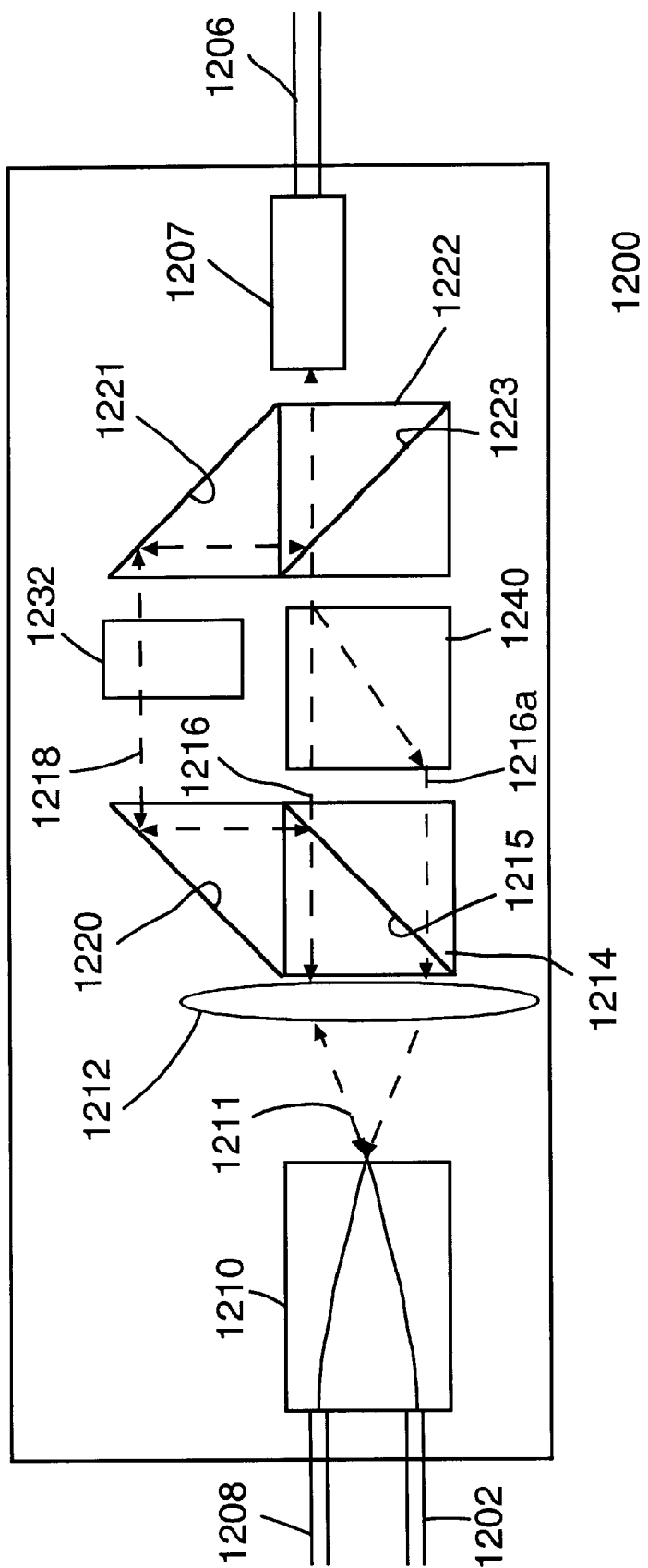
FIG. 12 schematically illustrates an embodiment of a multiwavelength fiber optic device providing circulation at one wavelength.

Another embodiment of a fiber optic device 1200 operating at two wavelengths is illustrated in FIG. 12. The device 1200 includes a circulator 1240 and operates as follows. A first fiber 1202 couples to an external fiber system. The output from the first fiber is collimated by the collimating lens 1210 and is parallelized by the parallelizing optic 1212, for example in a manner as described with regard to the embodiment illustrated in FIG. 4. A second fiber 1206 is coupled to the external fiber system, and has a collimating lens 1207 for collimating light output from the second fiber 1206 and for focusing light into the second fiber 1206.

Light 1211 at two wavelengths, λ1 and λ2, is transmitted from the first fiber 1202 into a wavelength separator 1214, which may be a beamsplitter cube having a dichroic reflector 1215. The first wavelength component 1216 is transmitted by the dichroic reflector 1215 to the circulator 1240, and is transmitted to the wavelength combiner 1222, which may be a beamsplitter cube having a dichroic reflector 1223. The first wavelength component 1216 is transmitted through the dichroic reflector 1223. The second wavelength component 1218 is reflected at the dichroic reflector 1215 and directed to the combiner 1222 along a path different from the first wavelength component 1216, and avoids passage through the circulator 1240. The second wavelength component 1218 may be reflected by first and second reflecting surfaces 1220 and 1221 to the combiner 1222, where it is reflected by the dichroic reflector 1223. The reflecting surfaces 1220 and 1221 may be internally reflecting prism surfaces, as illustrated, or front surface mirrors or the like. An optical device 1232 may be provided in the path of the second wavelength component 1218, between separator 1214 and the combiner 1222. The first and second wavelength components 1216 and 1218 are combined at the dichroic surface 1223 and a combined output beam 1230 propagates to the second fiber 1206.

We now consider light, at the two wavelengths λ1 and λ2, passing from the second fiber 1206 back through the device 1200. The reverse-propagating light is split into the two wavelength components at the combiner 1222, by transmitting the first wavelength component 1216 through the dichroic reflector 1223 and reflecting the second wavelength component 1218. The second wavelength component retraces the path via the reflectors 1221 and 1220 to the separator 1214 where it reflects off the dichroic surface 1215 and is directed back to the first fiber 1202. The first wavelength component 1216, however, is deviated by the circulator 1240 onto a different path 1216a, which is transmitted through the dichroic reflector 1215. The first wavelength 1216a component on the different path does not return to the first fiber, but passes through the parallelizing optic 1212 and the collimating lens 1210 to a third fiber 1208.

Thus, the device 1200 permits light at one wavelength, λ2, to pass back and forth between the first and second fibers 1202 and 1206. However, light at λ1 is directed from the first fiber 1202 to the second fiber 1206 and from the second fiber 1206 to the third fiber 1208.

Figure 13:
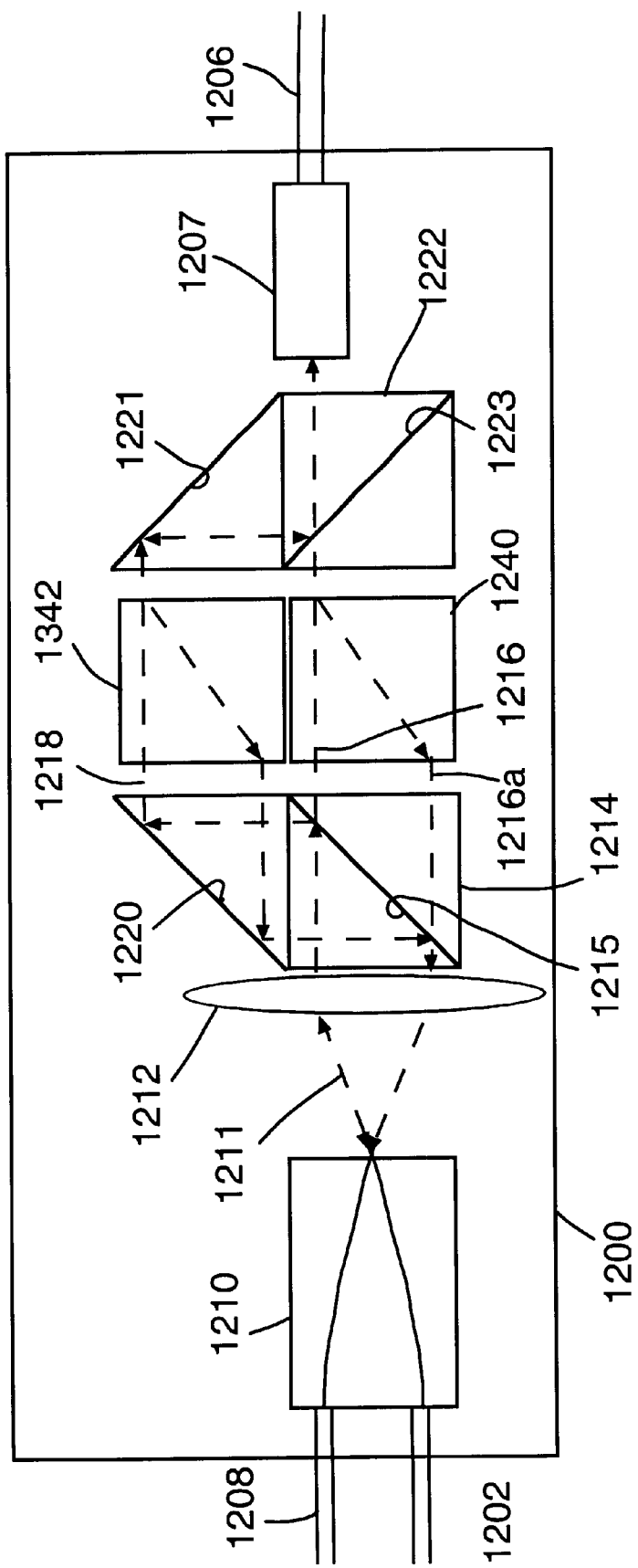
FIG. 13 schematically illustrates an embodiment of a multiwavelength fiber optic device providing circulation at two wavelengths.

The optical device 1232 may be a circulator that operates at the second wavelength λ2. This is illustrated in FIG. 13, where the second wavelength component 1218 passes through a second circulator 1342. The second circulator 1342 operates in a manner similar to the circulator 1240 for the first wavelength component 1216. The second wavelength component 1218 passes through the circulator 1242 to the second fiber 1206. In the reverse direction, the second wavelength component is deviated along a different path 1218a, and combines with the deviated first wavelength component 1216a, and is subsequently transmitted to the third fiber 1208. This particular embodiment is advantageous when is it required that light at two different wavelength ranges is to be circulated, since the bandwidth of a circulator is typically limited to a relatively narrow range for effective operation.

As noted above, the present invention is applicable to fiber optic systems and is believed to be particularly useful in systems that operate at more than one wavelength. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

For example, the invention has been described with regard to two wavelength components. It will be appreciated that more than two wavelength components may be present. In such a case, one component may be separated from the other components, or different components may be separated out. For example, where three wavelength components are present, the component at λ1 may be separated from the other two components, λ2 and λ3. The two components λ2 and λ3 may then be separated from each other, or they may remain mixed.

It will also be appreciated that more than one optical device may be employed where only one was shown in the figures. For example, with regard to the embodiment illustrated in FIG. 3, the first wavelength component 316 may pass through more than one optical device between the wavelength separator 314 and the wavelength combiner 322. It will further be appreciated that many different configurations and arrangements of reflectors may be used in the multi-wavelength fiber optic device. The claims are intended to cover such modifications and devices.

We claim:

1. A fiber optic device, comprising:
   a first optical fiber optically coupled to transmit light at first and second wavelengths along a first optical path;
   a wavelength separator disposed on the first optical path and adapted to direct light at the first wavelength along a second optical path and light at the second wavelength along a third optical path different from the second optical path;
   a wavelength combiner optically coupled to combine light propagating along the second and third optical paths into a fourth optical path;
   a second optical fiber optically coupled to the fourth optical path;
   a first optical device disposed along the second optical path, between the wavelength separator and the wavelength combiner to operate on light at the first wavelength; and
   a first collimating unit disposed to couple light between the first optical fiber and the first optical path, and to couple light between the second optical fiber and the fourth optical path.

2. A device as recited in claim 1, further comprising a second optical device disposed along the third optical path, between the wavelength separator and the wavelength combiner to operate on light at the second wavelength.

3. A device as recited in claim 1, further comprising a housing containing the wavelength separator, the wavelength combiner and the first optical device.

4. A device as recited in claim 1, further comprising a parallelizing optic disposed between the collimating unit and both the wavelength separator and wavelength combiner.

5. A device as recited in claim 1, wherein the wavelength separator is a dichroic mirror.

6. A device as recited in claim 1, wherein the wavelength combiner is a dichroic mirror.

7. A device as recited in claim 1, wherein the wavelength separator is a polarization separator.

8. A device as recited in claim 1, wherein the first optical device is a filter.

9. A device as recited in claim 1, wherein the first optical device is an optical switch.

10. A device as recited in claim 1, wherein the first optical device is an optical modulator.

11. A device as recited in claim 1, wherein the first optical device is a first optical circulator.

12. A device as recited in claim 11, further comprising a third optical fiber, wherein light propagating through the first optical circulator from the wavelength combiner is directed along a fifth optical path, different from the second optical path, to the wavelength separator, and along a sixth optical path from the wavelength separator to the third optical fiber.

13. A device as recited in claim 12, further comprising a second optical circulator disposed in the third optical path, wherein light propagating through the second optical circulator from the wavelength combiner is directed along a seventh optical path, different from the third optical path, to the wavelength separator, and is combined with light propagating along the fifth optical path to propagate along the sixth optical path to the third optical fiber.

14. A system as recited in claim 1, wherein the first wavelength is 1.55 µm.

15. A system as recited in claim 1, wherein the difference between the first and second wavelengths is at least 20 nm.

16. A fiber optic device, comprising:
   wavelength splitting means for splitting a light beam into a first light beam containing light at a first wavelength and a second light beam containing light at a second wavelength, the first and second beams respectively propagating along first and second beam paths;
   a first optical device disposed on the first beam path to operate on the first light beam;
   wavelength combining means for combining light propagating in the first direction along the first beam path, and light propagating in the first direction along the second beam path into a single output beam; and
   light collimating and focusing means for commonly collimating the light beam incident on the wavelength splitting means and focusing the single output beam.

17. A fiber optic device, comprising:
   first and second optical fibers optically coupled via first and second optical paths respectively to a wavelength combiner, light at a first wavelength from the first optical fiber being combined with light at a second wavelength from the second fiber at the wavelength combiner to form a combined output beam;
   a third optical fiber coupled via a third optical path to receive the combined output beam from the wavelength combiner;
   a first optical device positioned on the first optical path and between the first optical fiber and the wavelength combiner; and
   a collimating unit disposed on the first optical path and on the second optical path to collimate light entering the device from the first and second fibers.

18. A device as recited in claim 17, further comprising a second optical device disposed on the second optical path between the second optical fiber and the wavelength combiner.

19. A device as recited in claim 17, further comprising a housing containing the wavelength combiner and the first optical device.

20. A device as recited in claim 17, wherein the wavelength combiner includes a dichroic reflector.

21. A device as recited in claim 17, wherein the wavelength separator is a polarization separator.

22. A device as recited in claim 17, wherein the first optical device is an optical modulator.

23. A device as recited in claim 17, wherein the first optical device is an optical filter.

24. A device as recited in claim 17, further comprising a parallelizing optic disposed between the collimating unit and the wavelength combiner.

25. A device as recited in claim 17, further comprising a first optical transmitter coupled to the first optical fiber, an optical receiver coupled through an external fiber optic system to the third optical fiber and a second light source coupled to second optical fiber.

26. A device as recited in claim 17, further comprising a second collimating unit disposed on the third optical path between the wavelength combiner and the third optical fiber.

27. A fiber optic device, comprising:

a first optical fiber optically coupled via a first optical path to a wavelength separator to transmit light to the wavelength separator, the wavelength separator arranged to separate light received from the first optical fiber into components at first and second wavelengths;

a second optical fiber coupled via a second optical path to the wavelength separator to receive light at the first wavelength;

a third optical fiber coupled via a third optical path to the wavelength separator to receive light at the second wavelength;

a first optical device positioned on the second optical path and between the second optical fiber and the wavelength separator; and a collimating unit disposed to couple light from the second optical path to the second optical fiber and to couple light from the third optical path to the third optical fiber.

28. A device as recited in claim 27, further comprising a second optical device disposed on the third optical path between the wavelength separator and the third optical fiber.

29. A device as recited in claim 27, further comprising a housing containing the wavelength separator and the first optical device.

30. A device as recited in claim 27, wherein the wavelength separator includes a dichroic reflector.

31. A device as recited in claim 27, wherein the wavelength separator is a polarization separator.

32. A device as recited in claim 27, wherein the first optical device is an optical modulator.

33. A device as recited in claim 27, wherein the first optical device is an optical filter.

34. A device as recited in claim 27, a parallelizing optic disposed between the collimating unit and both the second and third optical fibers.

35. A device as recited in claim 27, further comprising a second collimating unit disposed on the first, optical path between the first optical fiber and the wavelength separator.

\* \* \* \* \*